Feb. 26, 1957 R. C. WAHRMUND 2,782,935
WIRE TAKE-UP DEVICE FOR A DRUM FILTER
Filed Oct. 14, 1954

INVENTOR.
Robert C. Wahrmund,
BY
ATTORNEY.

United States Patent Office 2,782,935
Patented Feb. 26, 1957

2,782,935

WIRE TAKE-UP DEVICE FOR A DRUM FILTER

Robert C. Wahrmund, Baytown, Tex., assignor, by mesne assignments, to Esso Research and Engineering Company, Elizabeth, N. J., a corporation of Delaware Application October 14, 1954, Serial No. 462,329

4 Claims. (Cl. 210—199)

This invention concerns a device for use with conventional types of rotary drum filters. The invention is specifically concerned with a device for maintaining tension on the wire which is wrapped around the cloth mounted on a rotary drum filter.

Drum type filters are employed at the present time in many applications and in connection with a variety of chemical processes. In general, a rotary drum filter constitutes a large drum which is supported on an axle so that the drum can be rotated. The cylindrical surface of the drum is perforated and covered with a filter cloth. The drum ordinarily is partially submerged in a tank containing a liquid mixture to be filtered so that suction may be applied through the drum to bring liquid into the filter drum through the filter cloth as the drum is rotated. In addition to the filtering step indicated, as the drum is rotated, the filter cake formed on the drum may be exposed to a washing spray, a drying action, or other processing steps. The filter cake is removed from the drum during revolution of the filter by means of knives or so-called doctor blades.

In order to position the filter cloth on the drum and to firmly hold the filter cloth in position, it is conventional to wind the drum with a helix of fine wire. Commonly two such wires are employed which encircle the entire periphery of the drum at a spacing of a few inches. Commercial forms of such filters require wrapping wires which may be about 2000 feet long. Because of the length of these wires substantial changes in length may occur during filter operation. For one thing, the wire tends to wrap more tightly around the drum because of friction between the wire and the knife blade used for removal of the wax cake. Again, during the long service life of a filter the wire is subject to "creep" or stretch. Because of these factors it is necessary to provide means to take up excess wire during the useful life of a filter so as to maintain sufficient tension on the wire at all times to hold the filter cloth firmly in position. In order to have a completely satisfactory take-up device, it is desirable that the device be capable of taking up as much as 5 feet of wire while still maintaining a strong tension on the wire. It is one of the objects of this invention to provide a specific form of wire take-up device which will provide this objective, namely, to automatically take up an extensive length of wire while maintaining adequate tension on the wire.

Provision of a suitable wire take-up device of the character identified also entails necessity for letting out wire as well as taking up wire. This arises from the fact that rotary drum filters are commonly operated at extremely low temperatures so that the wire can contract sufficiently to set up breaking stresses. Consequently, it becomes necessary to release wire from a take-up device whenever the filter is used at substantially lower temperatures than that of initial wire installation. Again it is one of the objects of this invention to provide a wire take-up device which will automatically release sufficient wire to avoid breakage during low temperature operation.

The objects of this invention are achieved by provision of a novel wire take-up device in which wire wrapped around the filter cloth of a drum filter is wound on a sheave at one end of the filter. In order to control take up or release of wire from this sheave, the sheave is coupled to or fixed on a spindle which is normally maintained under a torsional bias by means of a torsional spring coupled to the spindle. This apparatus can be suitably designed by selection of the torsional spring employed so that the sheave can take up extensive lengths of wire without serious change in the tension exerted on the wire.

The nature of this invention can be understood by reference to the accompanying drawing which illustrates a preferred form of the invention. In these drawings.

Figure 1:
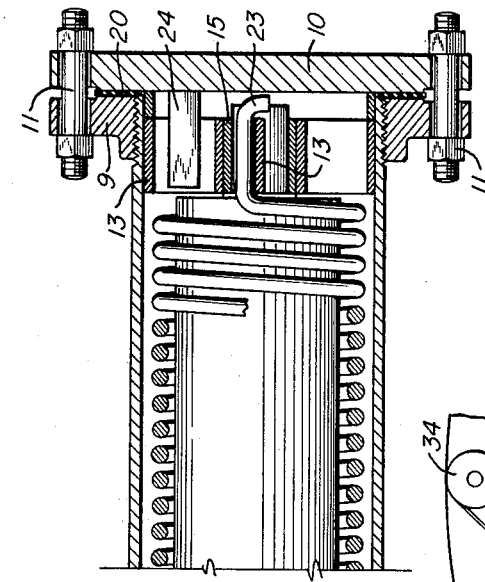
Fig. 1 illustrates in cross sectional detail the complete take-up device embodying the invention.

In the drawings similar elements are identified by the same numerals so in the following description reference may be made to either and both of the figures of the drawing for a full understanding of the apparatus. The numeral 1 designates the end plate of a drum filter to which the take-up device of this invention is mounted. The principal elements of the take-up device constitute a cylindrical spindle 2 having an axle 3 on which a sheave 4 is mounted. These elements are mounted on the end plate 1 of the filter so that the spindle is positioned inside the drum of the filter while the sheave is outside of the filter drum. A torsional spring 5 extends along the length of the spindle and is positioned about the spindle. As will be described, the torsional spring is coupled to the spindle so that when the device is employed a torsional bias tending to rotate the spindle will be maintained. In order to rotatably support the spindle and in order to provide a protective housing about the spindle, a cover or housing is provided. As illustrated, the housing can include a length of pipe 6 which may be threaded at both ends. The left end of pipe 6 may be threaded into a flange 7 which can be bolted to the end plate 1 of the filter by means of the bolts 8. The other end of pipe 6 may be threaded into a similar flange 9 bolted to a blind flange or closure member 10 by means of bolts 11. In order to rotatably support the spindle in the housing described, bearings are provided at either end of the spindle within the housing. As illustrated, it is convenient to employ spider bearings at both ends of the spindle designated by numerals 12 and 13. These spider bearings essentially constitute a pair of concentric cylinders held together by spider arms providing an outer bearing surface intended to fit tightly within the housing pipe 6 and an inner bearing surface adapted to support the axles of the spindle. As illustrated, it is preferred to employ a carbon bushing 15 between the inner bearing surface of the bearings 12 and 13 and the axle of the spindle. In order to complete the fluid-tight housing of the spindle and spring, a plate 18 is located in the left end of pipe 6. The plate 18 has arranged therein a sealing means 18a which bears on and seals around axle 3. Conventional gaskets 19 and 20 may be provided adjacent the flanges of the housing in order to eliminate any possibility of liquid passing into the housing.

In order to transmit torsional force from spring 5 to the spindle 2, spring 5 is fixed at one end to the spindle and at its other end to the housing described. This can be simply achieved by passing an extensive end of spring 5 through a suitable perforation 22 provided by an extension of the spindle 2 at its left end. The other end of spring 5 may have an extensive portion 23 which is formed to extend into one of the openings of the spider bearing 13. Rotation of spider bearing 13 is prevented by means of a stop bar 24 which may be fixed or welded to the blind flange 10. In this arrangement, the stop bar prevents rotation of spider bearing 13 which in turn serves to fix end 23 of the torsional spring against rotation. It will be understood then that by rotating the spindle 2, the spindle and spring will be placed under a torsional force limited by the spring characteristics and the rotation employed in "cocking" the device.

The sheave 4 may be mounted on the extensive axle 3 of spindle 2 by means of a holding nut 27 threaded on the end of axle 3. Wire is mounted on sheave 4 by wrapping the wire about the sheave running one end of the wire through hole 40 of the sheave and locking by means of set screws or the like. In order to control rotation of sheave 4, a pawl 28 is provided which is positioned to engage notched teeth 39 provided on the periphery of the sheave. Pawl 28 can be pivotally supported by a mounting screw 29 threaded into end plate 1 of the filter. A spring 30 is mounted on screw 29 having one end adapted to force the pawl 28 against the teeth of sheave 4. The other end of spring 30 is held by screw 31 so as to maintain the pawl spring under tension.

Figure 2:
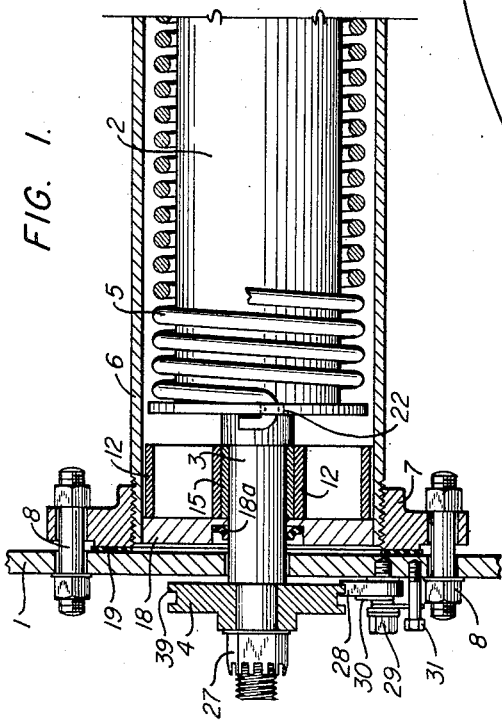
Fig. 2 is a left end view of the take-up device of Fig. 1 particularly illustrating the manner in which wire is passed from the sheave of the device over the filter cloth of the filter; and, Fig. 3 is a sectional view showing how wire is wrapped around and fastened to the sheave.
Figure 3:
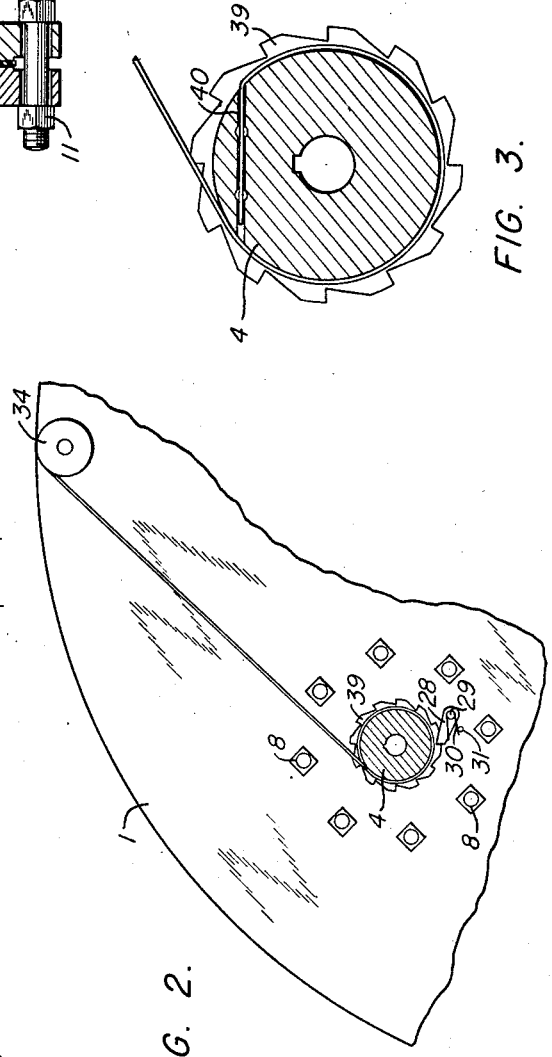

As particularly illustrated in Fig. 2, wire extending from sheave 4 passes over a pulley or spool 34 which is positioned on the end plate 1 of the filter adjacent the periphery of the drum of the filter. The wire is thus guided from the sheave 4 over the pulley to the surface of the drum.

In using the apparatus described, when a filter is placed in service the spindle is manually rotated, by means of a wrench or the like, in order to establish the desired torsional bias of the spindle. Pawl 28 is used to aid this "cocking" step. The wrapping wire is then positioned about the cloth of the filter and brought over the pulley to sheave 4. The end of the wire is fixed to the sheave and a number of turns of wire is provided on the sheave for let-out capacity. The pawl is then released and removed from the end plate, placing the full spring tension on the wire. In practical applications, this may be conducted so as to provide an initial tension on the wire of about 250 pounds. During use of the filter any extension of the wire length will automatically cause the wire to be wrapped on sheave 4 under the torsional force applied by spring 5. In the event the wire shortens during use, the increased tension developed will pull additional wire from the sheave against the torsional force of the spring.

It is apparent that the preferred device of this invention described is subject to many modifications and refinements within the concept of this invention. For example, while the apparatus has been described as being supported entirely by one end plate of the filter, it is apparent that other support provisions can be employed. In this connection the take-up device of this invention can be fixed to reinforcing ribs provided within the filter drum. Again, for example, while the device has been described as including the particular housing illustrated, it is apparent that other types of housing could be employed. In this same connection it is contemplated that for particular applications the device can be employed without necessity for a protective housing. Particularly, in this case it is possible to employ the take-up device described by using a single bearing at the end of the spindle adjacent the sheave and maintaining torsional coupling between the spring and spindle by fixing one end of the spring with respect to the end plate of the filter and the other end of the spring to the spindle itself. These and other modifications of the invention are embraced within the scope of the following claims.

I claim:

1. A wire tensioning device for a continuous filter of the type including a hollow, end-plated filter drum, a filter cloth on the periphery of said drum and an embracing wire wound around said cloth, said tensioning device comprising a spindle having an extensive axle, support means connected with said spindle and one of said end plates for rotatably supporting said spindle on said end plate in the interior of said drum with said extensive axle of said spindle extending through said end plate, a helical torsion spring about said spindle, means interconnecting said spring with said spindle and said support means, a sheave fixed to said axle and carrying an end portion of said wire and a pulley element on said end plate of said drum adjacent the periphery thereof adapted to direct said wire from said sheave to the surface of said drum, whereby the torsional force of said spring may compensate for elongation and shortening of said wire.

2. The apparatus defined by claim 1 including a liquid-tight housing positioned about said spring and spindle provided with a liquid sealed passage for said extension axle.

3. A wire tensioning device for a continuous filter of the type including a hollow, end-plated filter drum, a filter cloth on the periphery of said drum and an embracing wire wound around said cloth, said tensioning device comprising a spindle positioned within said drum and having an extensive and portion thereof extending through an end of said drum, means to provide a torsional bias to said spindle, a sheave fixed to said extensive end of said spindle and carrying an end portion of said wire and a pulley element adjacent the periphery of the filter drum adapted to direct wire from said sheave to the surface of the drum, whereby the torsional bias of said spindle will cause compensation for elongation and shortening of said wire.

4. A wire tensioning device for a continuous filter of the type including a hollow, end-plated filter drum, a filter cloth on the periphery of said drum and an embracing wire wound around said cloth, said tensioning device comprising a spindle having an extensive axle, a helical torsion spring about said spindle, a liquid-tight housing fixed to the interior of one of said end plates and containing said spindle and said spring, bearing elements for said spindle fitting within said housing to rotatably support said spindle in said housing and to position said spindle so that said extension axle extends through said end plate of said filter drum, means for fixing one end of said spring to said housing and means for fixing the other end of said spring to said spindle, a sheave fixed to said extensive axle and carrying a portion of said wire, and a pulley element on said end plate of said drum adjacent the periphery thereof adapted to direct said wire from said sheave to the surface of said drum, whereby the torsional force of said spring may compensate for elongation and shortening of said wire.

References Cited in the file of this patent

UNITED STATES PATENTS

| 1,975,633 | Cakora | Oct. 2, 1934 |
| 2,145,933 | Kehrer | Feb. 7, 1939 |
| 2,636,611 | Rogers | Apr. 28, 1953 |
| 2,645,432 | Griffitts | July 14, 1953 |
| 2,650,713 | Nigh | Sept. 1, 1953 |